United States Patent
Yan et al.

(10) Patent No.: US 11,823,495 B2
(45) Date of Patent: Nov. 21, 2023

(54) KINECT-BASED AUXILIARY TRAINING SYSTEM FOR BASIC BADMINTON MOVEMENTS

(71) Applicant: Harbin Institute of Technology, Heilongjiang (CN)

(72) Inventors: Jihong Yan, Heilongjiang (CN); Zipeng Wang, Heilongjiang (CN)

(73) Assignee: Harbin Institute of Technology, Harbin (CN)

( * ) Notice: Subject to any disclaimer, the term of this patent is extended or adjusted under 35 U.S.C. 154(b) by 485 days.

(21) Appl. No.: 17/210,964

(22) Filed: Mar. 24, 2021

(65) Prior Publication Data
US 2021/0228959 A1    Jul. 29, 2021

(30) Foreign Application Priority Data
Apr. 10, 2020 (CN) .......................... 202010281536.0

(51) Int. Cl.
| | |
|---|---|
| *G06V 40/20* | (2022.01) |
| *A63B 24/00* | (2006.01) |
| *A63B 69/00* | (2006.01) |
| *G06F 17/11* | (2006.01) |
| *G06F 18/22* | (2023.01) |

(Continued)

(52) U.S. Cl.
CPC .......... *G06V 40/23* (2022.01); *A63B 24/0006* (2013.01); *A63B 24/0075* (2013.01); *A63B 69/0017* (2013.01); *G06F 17/11* (2013.01); *G06F 18/22* (2023.01); *G06V 10/464* (2022.01);

(Continued)

(58) Field of Classification Search
CPC .... G06V 40/23; G06V 10/464; G06V 10/751; G06V 10/761; G06V 2201/033; G06V 2201/12; A63B 24/0006; A63B 24/0075; A63B 69/0017; A63B 2024/0015;

(Continued)

(56) References Cited

U.S. PATENT DOCUMENTS

| | | | | |
|---|---|---|---|---|
| 2014/0147820 | A1* | 5/2014 | Snow ................. | G09B 19/0038 434/247 |
| 2015/0324637 | A1* | 11/2015 | Utsunomiya .......... | G16H 20/70 382/107 |

(Continued)

FOREIGN PATENT DOCUMENTS

CN    105512621 B    4/2019

*Primary Examiner* — Christopher M Brandt (57) ABSTRACT

A Kinect-based auxiliary training system for basic badminton movements, includes a data collection module, a movement feature extraction and recognition module, and a movement standard degree analysis and guidance module. The data collection module is provided with a Kinect v2 somatosensory device for monitoring athletes in real time, and collecting 3D coordinate data of 25 joint points of athletes' whole body. The movement feature extraction and recognition module is provided for establishing a standard template, and obtaining a similarity between the movement data and the standard template. The movement standard degree analysis and guidance module is provided for determining a category of the current movement of the user to be tested according to the similarity, and further analyzing whether the current movement of the user to be tested meets a standard according to a threshold range of the bone included angle set by a technology evaluation rule.

7 Claims, 3 Drawing Sheets

(51) Int. Cl.
*G06V 10/46* (2022.01)
*G06V 10/75* (2022.01)
*G06V 10/74* (2022.01)

(52) U.S. Cl.
CPC .......... *G06V 10/751* (2022.01); *G06V 10/761* (2022.01); *A63B 2024/0015* (2013.01)

(58) Field of Classification Search
CPC .......... A63B 71/0622; A63B 2071/063; A63B 2102/04; G06F 17/11; G06F 18/22
See application file for complete search history.

(56) References Cited

U.S. PATENT DOCUMENTS

| | | | |
|---|---|---|---|
| 2015/0325270 A1* | 11/2015 | Utsunomiya | G16H 30/20 |
| | | | 386/230 |
| 2016/0049089 A1* | 2/2016 | Witt | G09B 5/02 |
| | | | 434/258 |
| 2018/0125408 A1* | 5/2018 | Kim | A61B 5/1125 |
| 2019/0046836 A1* | 2/2019 | Starkey | A63B 24/0075 |

* cited by examiner

KINECT-BASED AUXILIARY TRAINING SYSTEM FOR BASIC BADMINTON MOVEMENTS

CROSS-REFERENCE TO RELATED APPLICATIONS

This application claims the benefit of priority from Chinese Patent Application No. 202010281536.0, filed on Apr. 10, 2020. The content of the aforementioned application, including any intervening amendments thereto, is incorporated herein by reference in its entirety.

TECHNICAL FIELD

The present application relates to human-computer interaction, and more particularly to a Kinect-based auxiliary training system for basic badminton movements.

BACKGROUND

In China, badminton has become the sport with the largest number of participants, and the number of participants has reached 250 million. The level of badminton competition is closely related to the solidity of the basic skills, but the high cost of coaching has prevented many participants from laying a good foundation. Therefore, it is urgent to develop an auxiliary training system for basic badminton movements to effectively solve the above problem. At the same time, with the continuous innovation of depth cameras, a motion recognition technology based on machine vision has made long-term progress, and is gradually assisting in completing various tasks in our lives, which makes it possible to develop an auxiliary training system for basic badminton movements. Currently, relevant patents have been published. Chinese Patent No. 105512621B discloses a Kinect-based badminton movement guidance system, in which a DTW algorithm and a similarity measurement method are adopted to recognize and evaluate badminton movements, without comprehensive consideration of the different features of athletes such as age, posture, gender, and dominant hand. However, the patent lacks actual verification in the scope of application and lacks relevant scientific basis in determining the threshold. In Chinese Patent No. 105512621B, global torso features are collected, which makes the calculation of body posture, stance and other movement recognition large and affects the accuracy of movement recognition.

SUMMARY

An object of the present disclosure is to solve the problems of small application range and low accuracy of the badminton movement guidance system adopting the DTW algorithm, and to provide a Kinect-based auxiliary training system for basic badminton movements.

The present disclosure provides a Kinect-based auxiliary training system for basic badminton movements, comprising:
 a data collection module;
 a movement feature extraction and recognition module; and
 a movement standard degree analysis and guidance module;
wherein the data collection module is provided with a Kinect v2 somatosensory device for monitoring an athlete in real time, and collecting three-dimensional coordinate data from 25 joint points of a whole body of the athlete; wherein the athlete is a coach or a user to be tested;

the movement feature extraction and recognition module is provided for extracting and recognizing movement data of the coach to establish a standard template; and extracting and recognizing movement data of the user to be tested, thereby obtaining a similarity between the movement data of the user to be tested and the movement data in the standard template;

wherein a process of establishing the standard template comprises:

extracting an included angle feature of key bones of effective joint points involved in each category of movements according to requirements of badminton movement rules; and establishing a movement feature set of each category of movement, thereby constructing the standard template of the movement feature set of all categories of movements;

a process of extracting and recognizing the movement data of the user to be tested comprises:

extracting included angle features of all bones involved in the 25 joint points of the user to be tested to form a feature vector to be measured; and obtaining an Euclidean distance between the feature vector to be measured and the movement feature set in the standard template, to identify the similarity between the movements of the user to be tested and each category of movements in the standard module;

the movement standard degree analysis and guidance module is provided for determining a category of a current movement of the user to be tested according to the similarity between the movements of the user to be tested and the each category of movements in the standard template, and further analyzing whether the current movement of the user to be tested meets a standard according to a threshold range of a bone included angle set by a technology evaluation rule of the category of current movement.

In some embodiments, the Kinect-based auxiliary training system further comprises a user interface module, for realizing functions of a display of an example picture of a standard movement in a client, a movement technology standard query, a replay of a current movement picture or video, a movement data query and a voice broadcast of analysis results using a text, picture, video embedding technology and a voice conversion technology.

In some embodiments, the process of establishing the standard template comprises:

extracting the included angle feature θ of the key bone of effective joint points involved in each category of movements as:

$$\cos\theta = \frac{x_1 x_2 + y_1 y_2 + z_1 z_2}{\sqrt{x_1^2 + y_1^2 + z_1^2} \times \sqrt{x_2^2 + y_2^2 + z_2^2}};$$

wherein $H_1=(x_1, y_1, z_1)$, $H_2=(x_2, y_2, z_2)$ are adjacent bone vectors described by three-dimensional coordinate data of joint points;

a movement feature set of an i-th category of movement is $$\overline{A}_i = \left( \frac{\sum_{j=1}^{m} \theta_{1,i,j}}{m}, \frac{\sum_{j=1}^{m} \theta_{p,i,j}}{m}, \frac{\sum_{j=1}^{m} \theta_{n,i,j}}{m} \right),$$

$$j = 1, 2, \ldots, m, p = 1, 2, \ldots, n;$$

wherein m is a sampling times of each of the included angle features of the key bones; n is the number of the included angle features of the key bones involved in the movement feature set of the i-th category of movement; and $\theta_{p,i,j}$ is an included angle feature value of a p-th key bone corresponding to a j-th sampling of the i-th category of movement.

In some embodiments, the process of extracting and recognizing the movement data of the user to be tested comprises:

obtaining the included angle feature θ of the key bone according to the three-dimensional coordinate data of the 25 joint points of the user to be tested as:

$$\cos\theta = \frac{x_1 x_2 + y_1 y_2 + z_1 z_2}{\sqrt{x_1^2 + y_1^2 + z_1^2} \times \sqrt{x_2^2 + y_2^2 + z_2^2}};$$

wherein $H_1 = (x_1, y_1, z_1)$, $H_2 = (x_2, y_2, z_2)$ are the adjacent bone vectors described by three-dimensional coordinate data of joint points;

removing invalid data according to the badminton movement rules, and forming the feature vector to be measured $A_i' = (\theta_1, \theta_2, \theta_n)$; and obtaining the similarity between the movements of the user to be tested and the each category of movements in the standard module as:

$$\text{similarity}(\overline{A}_i, A_i') = \sqrt{\sum_{p=1}^{n} (\theta_{ip} - \theta_{i'p})^2};$$

wherein $\theta_{ip}$ is an included angle feature of the p-th key bone in the movement feature set of the i-th category of movement in the standard module;

$\theta_{i'p}$ is the included angle feature of the p-th key bone in the feature vector to be measured.

In some embodiments, there are at least two coaches participated in recording movements when establishing the standard template; the sampling times m of each of the included angle features of the key bones is at least 10; each movement is recorded for 3 to 5 seconds; and an average processing is performed on angle features in a stable collection interval at equal intervals.

In some embodiments, the coaches participating in recording movements have different dominant hands, and all the coaches follow the same rules to complete a movement recording.

In some embodiments, a process of setting a threshold range of the bone included angle for an evaluation standard of each category of movements comprises:

first obtaining a normal distribution of a current feature value according to an average value of the movement recorded by the coach in the movement template;

obtaining a threshold interval of a completion degree more than 95% through a normal distribution of the current feature value; and further adjusting the threshold interval to determine an optical threshold range of the current evaluation item by combining with a previous training experience of the coach.

Compared to the prior art, the present invention has the following beneficial effects.

(1) In the present invention, non-wearable sensors are adopted in the data collection module to realize a movement recording, which reduces a burden of athletes, and realizes a movement analysis in actual trainings or competitions.

(2) In the movement feature extraction and recognition module, there is no need to measure the traditional distances or angle distance features of joint points of a whole body to analyze the typical motion features of the movement, thereby improving an ability of features to describe movements.

(3) In the movement feature extraction and recognition module, the included angle of the key bones is adopted as the movement feature to minimize the influence of age, gender, standing position and posture on the movement recognition process, and enhance a generalization ability of the model.

(4) In the movement feature extraction and recognition module, two coaches with different dominant hands are selected as movement templates for data recording, and multiple consecutive collections are performed, thereby ensuring the accuracy of the template and expanding the scope of application of the model.

(5) In the movement standard degree analysis and guidance module, different operating habits of athletes are taken into account, thereby establishing different evaluation standards for each movement. The threshold range of the evaluation points is determined by combining data fitting and empirical analysis, which not only improve the rationality of the threshold setting, but also improves the reliability of the movement analysis and guidance process.

(6) In a process of system function integration and user interface design, the voice broadcast function is adopted to remind the athletes of the movement problems obtained by the system analysis through voice. Meanwhile, the fixed time interval cycle analysis function provided in this module can realize continuous corrections of movements and complete movement training autonomously.

DETAILED DESCRIPTION OF EMBODIMENTS

Embodiment 1

Figure 1:
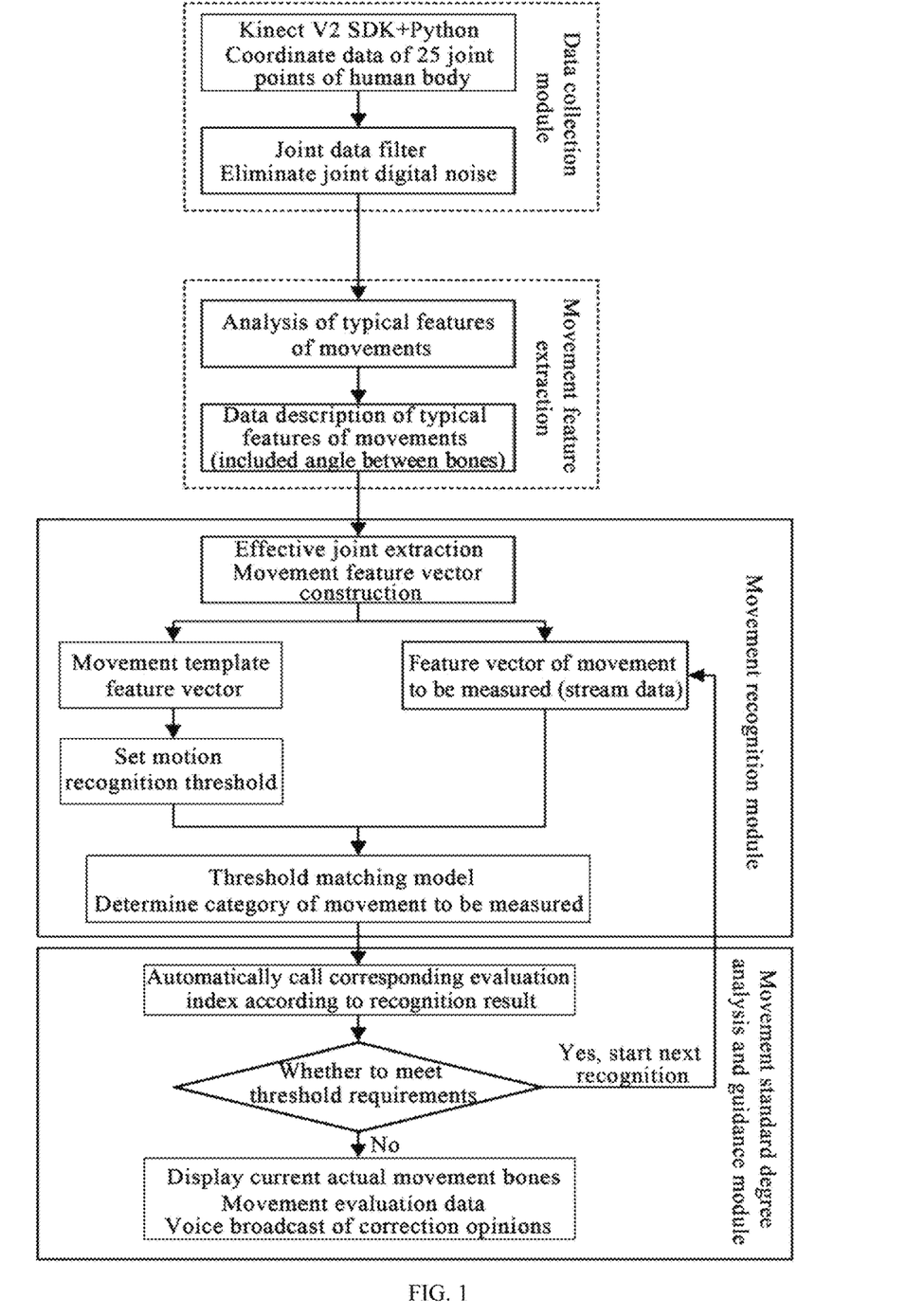
FIG. 1 is a flowchart of an operation of a Kinect-based auxiliary training system for basic badminton movements according to an embodiment of the present disclosure.

The embodiment will be described with reference to FIGS. 1-3. The embodiment provides a Kinect-based auxiliary training system for basic badminton movements, including a data collection module, a movement feature extraction and recognition module, and a movement standard degree analysis and guidance module.

The Kinect-based auxiliary training system for basic badminton movements can meet the training needs of different ages, genders, postures and sports habits. Through non-contact sensors such as Kinect, it can automatically assist to complete the standard and finalization of basic badminton movements under the condition of simulating the actual sports environment, thereby laying a foundation for high-quality completion of various subsequent complex movements.

The data collection module is provided with a Kinect v2 somatosensory device for monitoring an athlete in real time, and collecting three-dimensional coordinate data of 25 joint points of a whole body of the athlete. The athlete is a coach or a user to be tested.

Figure 2:
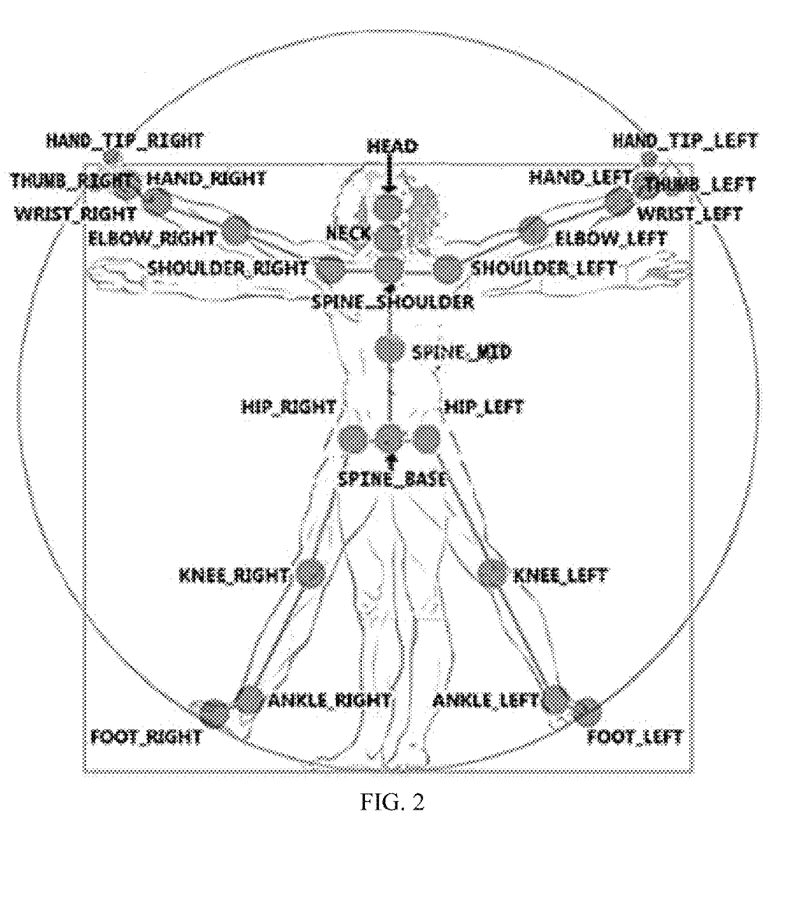
FIG. 2 is a schematic diagram of names and numbers of joint points extracted by the Kinect-based auxiliary training system for basic badminton movements according to an embodiment of the present disclosure.
Figure 3:
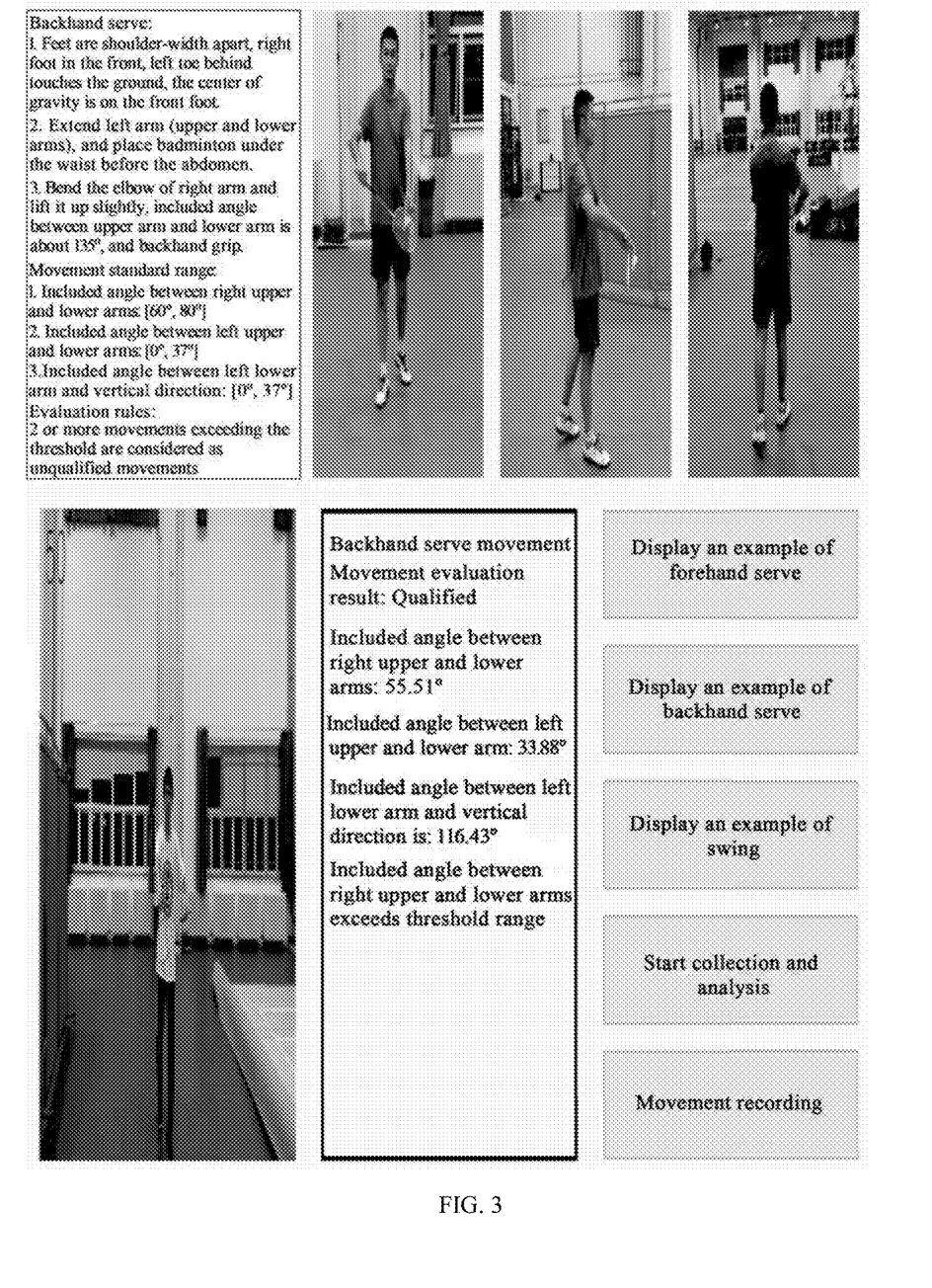
FIG. 3 is a schematic diagram showing a user interface of the Kinect-based auxiliary training system for basic badminton movements according to an embodiment of the present disclosure.

Specifically, the Microsoft Kinect v2 hardware device cooperates with the software service of Python+Kinect SDK to monitor the positions of 25 joint points (as shown in FIG. 2) of the athlete in real time.

The movement feature extraction and recognition module is provided for extracting and recognizing movement data of the coach to establish a standard template; and extracting and recognizing movement data of the user to be tested, thereby obtaining a similarity between the movement data of the user to be tested and movements in the standard template.

A process of establishing the standard template includes the following steps.

The included angle features of a key bone of effective joint points involved in each category of movements is extracted according to requirements of badminton movement rules. a movement feature set of each category of movements is established, thereby constructing the standard template of the movement feature set of all categories of movements. In order to expand the scope of application of the model, and reduce the influence of gender, age, posture and space station position on the recognition results, the traditional general features are abandoned, and the included angle between the key bones of the movements is calculated as the movement feature according to the typical movement features of each movement.

Specifically, the process of establishing the standard template includes the following steps.

The included angle features $\theta$ of the key bone of effective joint points involved in each category of movements is extracted as follows:

$$\cos\theta = \frac{x_1 x_2 + y_1 y_2 + z_1 z_2}{\sqrt{x_1^2 + y_1^2 + z_1^2} \times \sqrt{x_2^2 + y_2^2 + z_2^2}};$$

where $H_1=(x_1, y_1, z_1)$, $H_2=(x_2, y_2, z_2)$ are adjacent bone vectors described by three-dimensional coordinate data of joint points.

a movement feature set of an i-th category of movement is $$\bar{A}_i = \left( \frac{\sum_{j=1}^{m} \theta_{1,i,j}}{m}, \frac{\sum_{j=1}^{m} \theta_{p,i,j}}{m}, \frac{\sum_{j=1}^{m} \theta_{n,i,j}}{m} \right),$$

$$j = 1, 2, \ldots, m, p = 1, 2, \ldots, n;$$

where m is a sampling times of each of the included angle feature of the key bones. n is the number of the included angle features of the key bones involved in the movement feature set of the i-th category of movement; and $\theta_{p,i,j}$ is an included angle feature value of a p-th key bone corresponding to a j-th sampling of the i-th category of movement.

There are many categories of badminton movements, such as forehand serve, backhand serve and smash, and the effective joint points involved in each category of movements are different. For example, the effective joint points involved in backhand serve include: right wrist, right elbow, right shoulder, left wrist, left elbow and left shoulder, the included angle features of the key bones involved in backhand serve includes the included angle between right upper arm and right lower arm; the included angle between left upper arm and left lower arm; the included angle between the left lower arm and the vertical direction, where the included angle $\theta$ between the left upper arm and the left lower arm angle is taken as an example for explanation hereinafter.

It is assumed that the left upper arm bone is $H_1$=bigarmL= $(x_1, y_1, z_1)$, the left lower arm bone is $H_2$=litarmL=$(x_2, y_2, z_2)$, so the included angle $\theta$ between the left upper arm bone and the left lower arm bone is as follows:

$$\cos\theta = \frac{bigarmL \cdot litarmL}{|bigarmL| \times |litarmL|} = \frac{x_1 x_2 + y_1 y_2 + z_1 z_2}{\sqrt{x_1^2 + y_1^2 + z_1^2} \times \sqrt{x_2^2 + y_2^2 + z_2^2}},$$

$$\theta = \arccos\theta \times \frac{180°}{\pi}.$$

The calculations of other included angles between the bones are the same as above, and the movement angle feature set A is established. Instead of included angles of adjacent bones and the distances between joint points in the whole body adopted in the traditional algorithm, the included angles of the key bones are adopted as the features used in the movement intelligent recognition process in the present disclosure, thereby reducing the influence of posture and position on the accuracy of movement recognition.

The movement feature set of an i-th category of movement is $$\bar{A}_i = \left( \frac{\sum_{j=1}^{m} \theta_{1,i,j}}{m}, \frac{\sum_{j=1}^{m} \theta_{p,i,j}}{m}, \frac{\sum_{j=1}^{m} \theta_{n,i,j}}{m} \right),$$

$$j = 1, 2, \ldots, m, p = 1, 2, \ldots, n;$$

where m is a sampling times of each of the included angle features of the key bones. n is the number of the included angle features of the key bones involved in the movement feature set of the i-th category of movement. For example, in a backhand movement: the number of included angle features of the key bones is n=3.

$\theta_{p,i,j}$ is an included angle feature value of a p-th key bone corresponding to a j-th sampling of the i-th category of movement.

There are at least two coaches participated in recording movements when establishing the standard template; the sampling times m of each of the included angle features of the key bones is at least 10; each movement is recorded for 3 to 5 seconds; and an average processing is performed on angle features in a stable collection interval at equal intervals.

The coaches participating in the recording exercises have different dominant hands, and all the coaches follow the same rules to complete a movement recording. The movements of the coaches are collected multiple times, and disturbances such as equipment fluctuations and coach movement fluctuations are eliminated. The movements of the coaches are captured at equal intervals during a stable collection period, and then abnormal values are eliminated and an average processing on collected movements is performed.

After the feature sets of all categories of movements are collected, the movement standard templates for different movements and different dominant hands are finally completed.

A process of extracting and recognizing the movement data of the user to be tested includes the following steps.

Included angle features of all bones involved in the 25 joint points of the user to be tested are extracted to form a feature vector to be measured.

An Euclidean distance between the feature vector to be measured and the movement feature set in the standard template is obtained, thereby identifying the similarity between the movements of the user to be tested and each category of movements in the standard module.

Specifically, the process of extracting and recognizing the movement data of the user to be tested includes the following steps.

The key bone included angle features θ is obtained according to the three-dimensional coordinate data of 25 joint points of the user to be tested as:

$$\cos\theta = \frac{x_1 x_2 + y_1 y_2 + z_1 z_2}{\sqrt{x_1^2 + y_1^2 + z_1^2} \times \sqrt{x_2^2 + y_2^2 + z_2^2}};$$

where $H_1=(x_1, y_1, z_1)$, $H_2=(x_2, y_2, z_2)$ are the adjacent bone vectors described by three-dimensional coordinate data of joint points.

The invalid data are removed according to the rules of badminton movement, and the feature vector to be measured $A_i'=(\theta_1,\theta_2,\theta_n)$ is formed.

The similarity between the movements of the user to be tested and the each category of movements in the standard module is obtained as:

$$\text{similarity}(\overline{A_i}, A_i') = \sqrt{\sum_{p=1}^{n}(\theta_{ip} - \theta_{i'p})^2};$$

where $\theta_{ip}$ is an included angle feature of the p-th key bone in the movement feature set of the i-th category of movement in the standard module.

$\theta_{i'p}$ is the included angle feature of the p-th key bone in the feature vector to be measured.

When collecting movements of the athlete, the above-mentioned feature extraction algorithm is adopted to convert the specific movement into angle feature data, and the similarity between the current movement and each standard template is calculated based on the Euclidean distance, where a closer distance represents a greater similarity between the movements, and a further distance represents a smaller similarity on the contrary, so that the current movement category can be judged.

The movement standard degree analysis and guidance module is provided for determining a category of a current movement of the user to be tested according to the similarity between the movements of the user to be tested and the each category of movements in the standard template, and further analyzing whether the current movement of the user to be tested meets a standard according to a threshold range of a bone included angle set by a technology evaluation rule of the category of current movement.

A process of setting a threshold range of the bone included angle for an evaluation standard of each category of movements includes the following steps.

A normal distribution of the current feature value is firstly obtained according to the average value of the movement recorded by the coach in the movement template. A threshold interval of a completion degree more than 95% is obtained through a normal distribution of the current feature value. The threshold interval is further adjusted to determine an optical threshold range of the current evaluation item by combining with a previous training experience of the coach. A setting process of the threshold value of the included angle between the upper arm and the lower arm of the server in a forehand serve movement is taken as an example hereinafter, the included angle between the upper arm and the lower arm of the template movement (actions of the coaches) satisfies a normal distribution with a mean value of 5.25 degrees and a variance of 1.75, where a reasonable range of 99% movements is [0,10.5]. After an evaluation by professional badminton coaches, and considering that the current application range is amateur club trainings, the threshold range can be relaxed to [0,15].

Due to the inconsistency between the rule requirements and the main points of the basic movements, and the different sports habits of athletes, the athletes' movements are no longer required to be completely consistent with template movements. Based on the completion points and rule requirements of each movement, different movement evaluation standards are established to ensure the accuracy and reliability of the evaluation process. And according to the change trend of the coach template data and the coach's actual training experience, an independent movement threshold range is established for each evaluation point of each basic movement, and different thresholds are formulated according to different training needs to meet different requirements, thereby meeting the needs of different scenarios.

Embodiment 2

Different from the Embodiment 1, the auxiliary training system in Embodiment 2 further includes a user interface module, which is provided for realizing functions of displaying a standard movement sample picture in a client, querying a movement technology standard, replaying a current movement picture or a video, querying a movement data query and voice broadcasting of analysis results using a text, picture, video embedding technology and a voice conversion technology.

Specifically, the Python+Qt5 framework is adopted to realize a system function integration and a design of the UI interface. Data collection and data processing are independently performed by using a button trigger method. At the same time, the auxiliary training system supports continuous analysis at fixed intervals, and adopts the text, picture, video embedding technology and the voice conversion technology, to realize the functions of displaying the standard movement sample picture in a client, querying a movement technology standard, replaying a current movement picture or a video, querying a movement data query and voice broadcasting of analysis results.

After the movement to be measured is accurately identified and classified, the movement evaluation standard corresponding to the current category of movement is called, and the value of each evaluation point of the movement to be evaluated is compared with the standard threshold range one by one. If all the threshold requirements are satisfied, only the current movement picture and movement data are displayed on the screen. On the contrary, if there is an unsatisfactory situation, a voice broadcast is made for the out-of-tolerance item and movement adjustment suggestions are given, and the current problem and a correction method are displayed on the screen. For example, after an operator completes a forehand serve, the calculated included angle between the upper arm and the lower arm of the server is 16.25°, and the included angle forwardly exceeds the threshold range, and a corresponding forward out-of-tolerance voice package is generated and played automatically, where the playback content is "The current movement is a forehand serve movement. The current movement is unqualified, and the included angle between the upper arm and lower arm of the server is too large. It is recommended to straighten the server", so the assessment and recommendations of the current movement are completed.

Described above are preferred embodiments of the present disclosure, which are not intended to limit the scope of the present disclosure. Any changes, modifications, replacement, substitutions, combinations, simplifications and improvements without departing from the spirit and principle of the present disclosure shall fall within the protection scope of the present disclosure.

What is claimed is:

1. A Kinect-based auxiliary training system for basic badminton movements, comprising:
a data collection module;
a movement feature extraction and recognition module; and
a movement standard degree analysis and guidance module;
wherein the data collection module is provided with a Kinect v2 somatosensory device for monitoring an athlete in real time, and collecting three-dimensional coordinate data from 25 joint points of a whole body of the athlete; wherein the athlete is a coach or a user to be tested;
the movement feature extraction and recognition module is provided for extracting and recognizing movement data of the coach to establish a standard template; and extracting and recognizing movement data of the user to be tested, thereby obtaining a similarity between the movement data of the user to be tested and the movement data in the standard template;
wherein a process of establishing the standard template comprises:
extracting an included angle feature of key bones of effective joint points involved in each category of movements according to requirements of badminton movement rules; and
establishing a movement feature set of each category of movements, thereby constructing the standard template of the movement feature set of all categories of movements;
a process of extracting and recognizing the movement data of the user to be tested comprises:

extracting included angle features of all bones involved in the 25 joint points of the user to be tested to form a feature vector to be measured; and
obtaining an Euclidean distance between the feature vector to be measured and the movement feature set in the standard template, to identify the similarity between the movements of the user to be tested and each category of movements in the standard template;
the movement standard degree analysis and guidance module is provided for determining a category of a current movement of the user to be tested according to the similarity between the movements of the user to be tested and each category of movements in the standard template, and further analyzing whether the current movement of the user to be tested meets a standard according to a threshold range of a bone included angle set by a technology evaluation rule of the category of current movement.

2. The Kinect-based auxiliary training system of claim 1, further comprising a user interface module, for realizing functions of a display of an example picture of a standard movement in a client, a movement technology standard query, a replay of a current movement picture or video, a movement data query and a voice broadcast of analysis results using a text, picture, video embedding technology and a voice conversion technology.

3. The Kinect-based auxiliary training system of claim 1, wherein the process of establishing the standard template comprises:
extracting the included angle feature θ of the key bone of effective joint points involved in each category of movements as:

$$\cos\theta = \frac{x_1 x_2 + y_1 y_2 + z_1 z_2}{\sqrt{x_1^2 + y_1^2 + z_1^2} \times \sqrt{x_2^2 + y_2^2 + z_2^2}};$$

wherein $H_1=(x_1, y_1, z_1)$, $H_2=(x_2, y_2, z_2)$ are adjacent bone vectors described by three-dimensional coordinate data of joint points;

a movement feature set of an i-th category of movement is $$\bar{A}_i = \left(\frac{\sum_{j=1}^{m} \theta_{1,i,j}}{m}, \frac{\sum_{j=1}^{m} \theta_{p,i,j}}{m}, \frac{\sum_{j=1}^{m} \theta_{n,i,j}}{m}\right),$$

$$j = 1, 2, \ldots, m, \, p = 1, 2, \ldots, n;$$

wherein m is a sampling times of each of the included angle features of the key bones; n is the number of the included angle features of the key bones involved in the movement feature set of the i-th category of movement; and $\theta_{p,i,j}$ is an included angle feature value of a p-th key bone corresponding to a j-th sampling of the i-th category of movement.

4. The Kinect-based auxiliary training system of claim 3, wherein the process of extracting and recognizing the movement data of the user to be tested comprises:
obtaining the included angle feature θ of the key bone according to the three-dimensional coordinate data of the 25 joint points of the user to be tested as:

$$\cos\theta = \frac{x_1 x_2 + y_1 y_2 + z_1 z_2}{\sqrt{x_1^2 + y_1^2 + z_1^2} \times \sqrt{x_2^2 + y_2^2 + z_2^2}};$$

wherein $H_1=(x_1, y_1, z_1)$, $H_2=(x_2, y_2, z_2)$ are the adjacent bone vectors described by three-dimensional coordinate data of joint points;

removing invalid data according to the badminton movement rules, and forming the feature vector to be measured $A_i'=(\theta_1, \theta_2, \theta_n)$; and obtaining the similarity between the movements of the user to be tested and each category of movements in the standard template as:

$$\text{similarity}(\overline{A_i}, A_i') = \sqrt{\sum_{p=1}^{n}(\theta_{ip} - \theta_{i'p})^2};$$

wherein $\theta_{ip}$ is an included angle feature of the p-th key bone in the movement feature set of the i-th category of movement in the standard template;

$\theta_{i'p}$ is the included angle feature of the p-th key bone in the feature vector to be measured.

5. The Kinect-based auxiliary training system of claim 4, wherein there are at least two coaches participated in recording movements when establishing the standard template; the sampling times m of each of the included angle features of the key bones is at least 10; each movement is recorded for 3 to 5 seconds; and an average processing is performed on angle features in a stable collection interval at equal intervals.

6. The Kinect-based auxiliary training system of claim 5, wherein the coaches participating in recording movements have different dominant hands, and all the coaches follow the same rules to complete a movement recording.

7. The Kinect-based auxiliary training system of claim 1, wherein a process of setting a threshold range of the bone included angle for an evaluation standard of each category of movements comprises:

first obtaining a normal distribution of a current feature value according to an average value of the movement recorded by the coach in the movement template; obtaining a threshold interval of a completion degree more than 95% through a normal distribution of the current feature value; and further adjusting the threshold interval to determine an optimal threshold range of the current evaluation item by combining with a previous training experience of the coach.

* * * * *